UNITED STATES PATENT OFFICE.

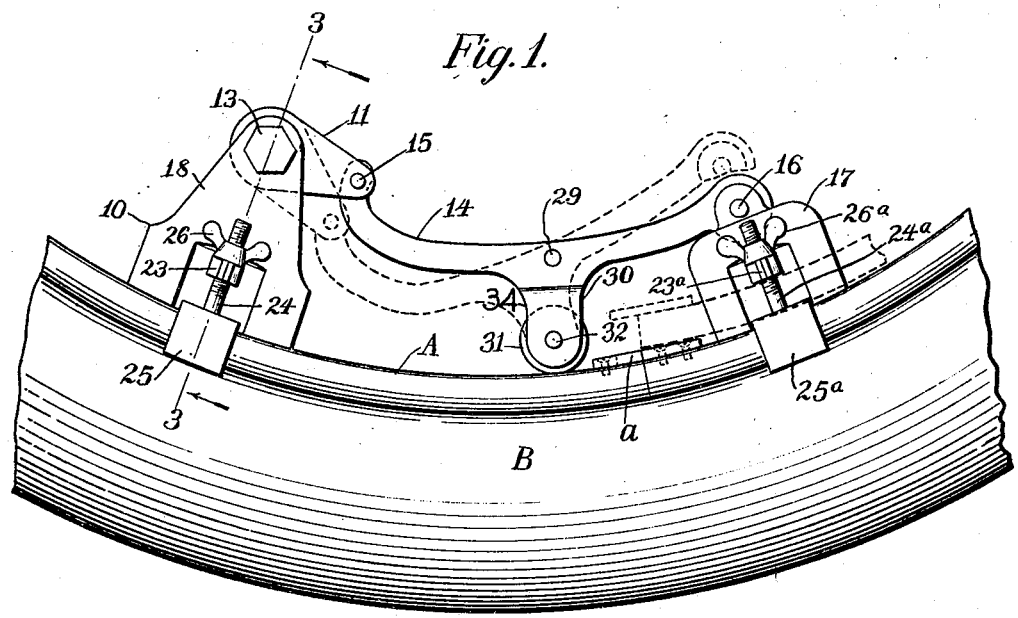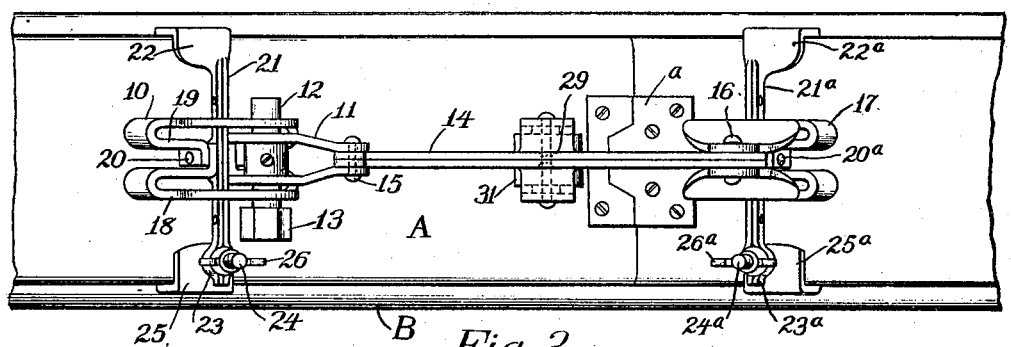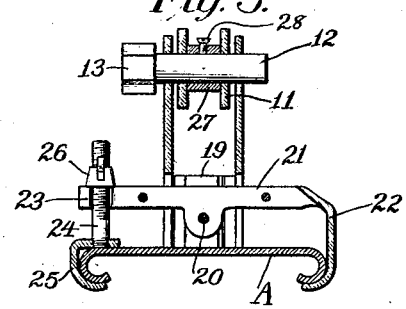

VERNON HENRY MANKEY, OF ABERDEEN, SOUTH DAKOTA.

TOOL FOR USE IN REMOVING AND REPLACING TIRES.

1,342,295.   Specification of Letters Patent.   Patented June 1, 1920.

Application filed September 25, 1918. Serial No. 255,586.

*To all whom it may concern:*

Be it known that I, VERNON HENRY MANKEY, a citizen of the United States, and a resident of Aberdeen, in the county of Brown and State of South Dakota, have invented a new and Improved Tool for Use in Removing and Replacing Tires, of which the following is a description.

Under the present methods employed, removal of a tire shoe or casing for repair of the inner tube or the like, usually requires considerable time and labor and not infrequently results in damage to the rim. The prime object of the invention is to provide a tool whereby the rim can be quickly displaced or restored in removing or replacing the tire and in a manner to minimize the possibility of injury to the rim.

A further object of the invention is to provide a tool of the indicated character that may be quickly placed in position gripping the respective ends of the rim and then the clamps be relatively moved through the medium of an ordinary wrench, so that the displacing of the rim or the restoring of the same can be effected in a few minutes.

Reference is to be had to the accompanying drawings forming a part of this specification, it being understood that the drawings are merely illustrative of one example of the invention.

Figure 1 is side elevation of a tool embodying my invention, illustrating the same applied to a tire rim shown in part;

Fig. 2 is a plan view thereof;

Fig. 3 is a cross section on the line 3—3, Fig. 1.

In carrying out my invention in practice in accordance with the illustrated example, a clamp designated generally by the numeral 10 is provided, adapted in a manner hereinafter described to grip a tire rim A near one end. On said clamp is a swingable arm 11 rigid with a pin 12 having bearings in the clamp 10. One end or trunnion presented by the pin 12 is polygonal as at 13 or given equivalent form to receive a wrench, whereby the pin may be turned in its bearings to thereby swing the arm 11. A lever 14 is pivotally connected at one end as at 15 with the arm 11 to be actuated by the swinging of the latter and on said link at the opposite end is pivotally hung as at 16, a second clamp designated generally by the numeral 17.

In the illustrated form the clamp 10 includes a frame or body presenting spaced sides 18 and the sides are bent inward as at 19 to receive a pivot 20 which passes through a transverse clamp bar 21 which thereby is rockably mounted at its approximate center. On one end of the clamp bar 21 is a rigid jaw 22 adapted to engage with a rolled edge at one side of the rim A. The opposite end 23 of the bar 21 receives loosely a stud 24, which is provided with a nut 26 and carries a jaw 25 which thus may be swung about the axis of the stud 24 to engage the said clamp with the opposite rolled edge of the rim A. The clamp 17 similarly is formed to receive the pivot 20ᵃ securing the transverse clamp bar 21ᵃ which corresponds with the bar 21 and its clamp jaws, there being a fixed jaw 22ᵃ, and a movable jaw 25ᵃ carried by a threaded stud 24ᵃ extending through the adjacent end 23ᵃ of the cross bar and receiving the clamp nut 26ᵃ. The arrangement of the rigid and movable jaws 22, 22ᵃ and 25, 25ᵃ is designed to facilitate the engagement and disengagement of the clamp with the rim.

The lever 14 is formed of two thicknesses of sheet metal in the present example, riveted as at 29, and the respective sides have brackets 34 projecting laterally and receiving the axial pin 32 of a friction roller 31. Thus, the brackets and the friction roller constitute a pressure device adapted to bear against the inner surface of the rim A in the movement of the lever 14 to have rolling contact with the rim and afford a shifting fulcrum for the lever. Any suitable or approved lock means *a* may be provided for the meeting ends of the rim A, the illustrated example being of known form.

With the described arrangement when the device is clamped on the tire rim adjacent to the respective ends thereof in order to displace the rim for removing the tire casing or shoe B, by permitting the rim to contract as usual, it is necessary only, with my improved tool in position, to apply a wrench to the end 13 of the pin 12 to swing the arm 11 from the full line position in Fig. 1 to the indicated dotted line position, thereby rocking the lever 14. The rocking of the lever causes the clamp 17 to displace the rim end gripped thereby to the dotted line position permitting the ends of the rim to overlap. Thus, the initial action of the lever 14 is to draw the clamp 17 and the rim end gripped thereby radially inward, the further movement of the arm 11 constituting the lever 14 a link to draw the clamp 17 toward the clamp 10 or at least to respond to the tendency of the rim to contract for bringing the clamps nearer together. Obviously, a reverse turning of the pin 12 by the wrench will give a reverse swinging movement to the arm 11, thereby separating the clamp 17 and finally restoring the rim into alined positions for locking.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A tool for removing and replacing tires, including a clamp adapted to grip a tire rim adjacent to one end thereof, an arm swingable on said clamp, a lever pivotally connected at one end with said arm to be actuated by the swinging of the latter, a laterally disposed element on the lever between the ends thereof adapted to bear against the tire rim between the end thereof on said clamp, and a second clamp carried by the opposite end of said lever and adapted to grip the rim near the adjacent end.

2. A tool of the class described including a clamp adapted to grip a tire rim near one end thereof, a pin extending transversely in the clamp and adapted to turn relatively thereto, said pin being adapted to receive a wrench turning the pin, a lateral arm rigid with the pin to be swung through an arc with the turning of the pin, a lever pivotally connected at one end with said arm, and a second clamp carried by said lever at its opposite end and adapted to grip the tire rim near its opposite end to displace or to restore said opposite end in the removal or replacing of a tire, and means on said lever between the ends thereof adapted to bear against the tire rim at the inner side thereof to thereby constitute a fulcrum for the lever.

3. A tool of the class described including a clamp adapted to grip a tire rim adjacent to one end of the latter, an arm swingable on said clamp, a lever pivotally connected at one end with said arm to be actuated by the swinging of the said arm on the clamp, a friction roller carried by said lever between the ends thereof adapted to bear against the inner surface of the tire rim to constitute a shifting fulcrum for the lever as the latter is actuated, and a second clamp carried by the opposite end of the latter and adapted to grip the adjacent end of the rim.

VERNON HENRY MANKEY.